United States Patent [19]

Gapp et al.

[11] Patent Number: 5,098,240
[45] Date of Patent: Mar. 24, 1992

[54] COMPOSITE FASTENER

[75] Inventors: Roland H. Gapp, South Laguna; Clyde D. Simmons, Riverside, both of Calif.

[73] Assignee: Textron Inc., Providence, R.I.

[21] Appl. No.: 527,745

[22] Filed: May 23, 1990

[51] Int. Cl.$^5$ .............................................. F16B 35/04
[52] U.S. Cl. ........................................ 411/424; 411/14; 411/900; 411/908
[58] Field of Search ............... 411/411, 424, 903, 904, 411/907, 908, 902, 901, 900, 14

[56] References Cited

U.S. PATENT DOCUMENTS

| | | | |
|---|---|---|---|
| 2,901,455 | 8/1959 | Jurras | 428/112 |
| 2,943,967 | 7/1960 | Simon | 411/908 |
| 2,949,054 | 8/1960 | White | 411/418 |
| 3,495,494 | 2/1970 | Scott | 411/411 |
| 3,995,092 | 11/1976 | Fuchs | 411/900 |
| 4,576,847 | 3/1986 | Tajima | 411/411 |
| 4,623,290 | 11/1986 | Kikuzawa et al. | 411/908 |
| 4,717,302 | 1/1988 | Adams et al. | 411/903 |
| 4,909,690 | 3/1990 | Gapp et al. | 411/908 |

FOREIGN PATENT DOCUMENTS

| | | | |
|---|---|---|---|
| 558892 | 2/1975 | Switzerland | 411/908 |
| 1155708 | 6/1969 | United Kingdom | . |
| 1364076 | 8/1974 | United Kingdom | 428/112 |

Primary Examiner—Neill R. Wilson
Attorney, Agent, or Firm—Knobbe, Martens, Olson & Bear

[57] ABSTRACT

A composite fastener which provides up to 70 KSI in shear strength in a ¼ inch shank diameter and includes several layers having long parallel carbon fibers embedded in resin. The layers are pressed together and heated to form a panel. The panel is cut into bars which are then machined into rods, used to form threaded or unthreaded composite shear pins. The fibers in adjacent layers are angled with respect to one another to provide maximum shear strength in a particular direction. The head of the shear pin is preferably marked to indicate the orientation of maximum shear strength.

22 Claims, 3 Drawing Sheets

COMPOSITE FASTENER

FIELD OF THE INVENTION

The present invention relates to composite fasteners which exhibit high shear strengths.

BACKGROUND OF THE INVENTION

Over the past 25 years, metal fasteners have been used extensively in the construction of aircraft. The fasteners are commonly used to fasten two sections of aircraft skin together. These fasteners are often similar in appearance to commercial bolts or rivets. Typically, metal fasteners have a head, and a shank. The shank is commonly threaded so that a nut can be affixed to the shank whereby the two sections of aircraft skin are fastened between the head and the nut. It is also common to manufacture metal fasteners without threads in the shank, and with this configuration the end of the shank is pressed on the other side of the aircraft skin to form a head which fastens the two sections together.

During normal operation, fasteners used in aerospace applications are generally placed under a high shear load, and a relatively low tension load. Thus, it is desireable to design fasteners which exhibit a high shear strength, while the requirements for tensile strength are not as rigorous. Because of their high shear strength, these types of fasteners are commonly known as shear pins. Many of the most satisfactory metal shear pins are made from 6AL4V titanium which has a design shear strength of 95 KSI.

The use of composite materials to make certain components of aerospace vehicles has increased rapidly over the past 20 years. Numerous metal shear pins have been developed to join together the composite components of these vehicles. The use of composite shear pins to replace metal shear pins in such applications results in the elimination of corrosion, as well as considerable weight savings. In addition to these advantages, a composite shear pin improves the match between the coefficient of expansion of the fastener and the structure.

Composite shear pins have been fabricated from a fiber-reinforced thermoplastic matrix. Initially, a panel is made by stacking composite tapes one on top of the other. The tapes are heated and pressed which causes the matrix material to melt, consolidate, and then, upon cooling, to become a flat solid panel. The panel is then cut into square section rods. These square section rods advantageously have a thickness equal to or slightly greater than the desired shear pin diameter. The square section rods are then ground or machined into round cross-section rods which are then cut to length and warm-formed by a suitable method to produce a manufactured head and also threads, if these are desired.

Recently, some shear pins made from fiber-reinforced polymer matrix composites have been developed that provide average shear strengths of about 50 KSI (50,000 PSI). These composite shear pins are finding applications, for the reasons previously mentioned, in joints where titanium shear pins are presently used, but where much less than 95 KSI loads are seen by the shear pins concerned. While 50 KSI average shear strength is satisfactory in many applications, higher shear strengths which are closer to the 95 KSI of 6AL4V titanium are desirable to make substitutions possible in more highly loaded joints. Thus, a need exists for a composite fastener which can be used in applications where the expected shear load is in excess of 50 KSI.

SUMMARY OF THE INVENTION

The present invention is a composite fastener which provides enhanced shear strengths, in a ¼ inch diameter shank, of up to 66 KSI. The fastener is made of a composite material including a plurality of layers bonded together by a binder, the layers having carbon fibers running therethrough. The layers are oriented such that the shear strength of the fastener shank is a maximum in one orientation. The shear strength in other orientation is less. Indicia on the head of the fastener indicates the orientation of the layers in the fastener. In a preferred embodiment, the layers are oriented so that the fibers in selected layers are skewed with respect to fibers in other layers. The angular alignment of the fibers in adjacent layers follows a pattern which repeats throughout the fastener.

In one desireable example, a group of successive layers within the fastener comprises a first layer, having fibers oriented at 45° as measured clockwise with respect to a longitudinal axis of the fastener. A second layer adjacent to the first has fibers oriented at 135° with respect to the longitudinal axis. Third and fourth layers following the second have fibers oriented parallel to the longitudinal axis.

DETAILED DESCRIPTION OF THE PREFERRED EMBODIMENT

Figure 1:
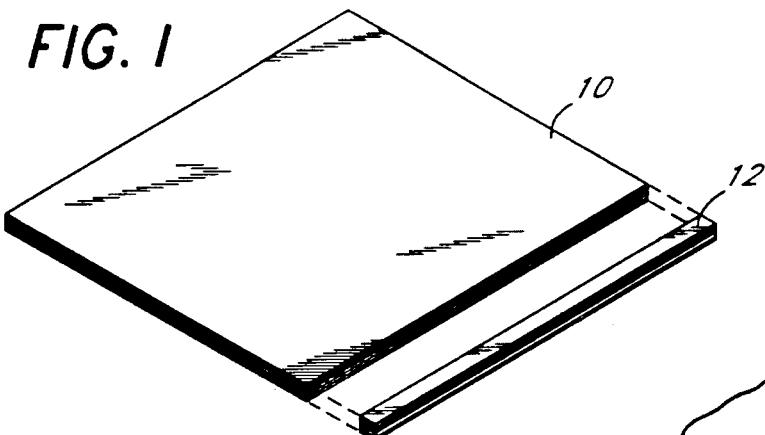
FIG. 1 is a perspective view showing a panel fabricated from layers of tape, and a square cross-section bar cut from it.
Figure 2:
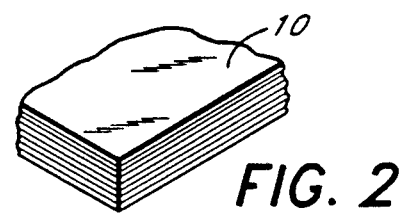
FIG. 2 shows an enlarged portion of the panel face which depicts the layers of the tape within the panel.

FIG. 1 depicts a composite panel 10 and a square cross-section bar 12 which is cut from the panel 10. The composite panel 10 is initially formed from thin sheet-like tapes creating plies, or layers, which consist of a polymer matrix containing fibers which add to the strength of the plies. FIG. 2 depicts an enlarged view of the composite panel 10 having multiple tape layers. A suitable ply has a thickness of about 0.005 inch, but other thicknesses can be utilized. The plies are made into panels 10 by stacking the plies one on top of the other until a desired thickness is provided (for example, 100 plies would provide a panel thickness of approximately 0.5 inches). The stack of plies is then heated while applying a compressive load. This process causes the binder in adjacent plies of tape to melt and flow so that the plies are bound together. After the panel 10 is formed, it is cooled. This creates a rigid composite panel 10 having the desirable characteristics discussed above.

Figure 3:
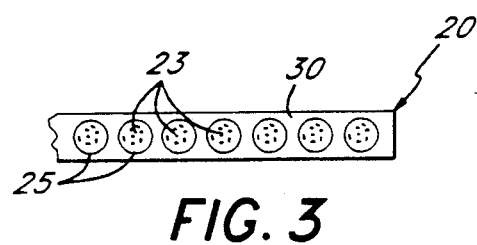
FIG. 3 is an enlarged cross section of a portion of a single layer of tape showing the ends of the tows in a polymer matrix.

FIG. 3 schematically depicts a cross-section of a portion of an individual ply 20. The ply 20 contains a plurality of individual carbon or other reinforcing fibers 23 which are twisted or otherwise held together in a bundle referred to as a "tow." A commonly-used fiber is about 7 microns in diameter. A commonly-used tow 25 contains 12,000 individual fibers. The tows 25 are arranged parallel to each other within the ply 20, and are held together by a polymeric resin 30 which acts as a binder. A suitable resin 30 for binding the carbon tows 25 together is the thermoplastic polymer polyetheretherketone (PEEK), although one skilled in the art will appreciate that other binding resins can be used in accordance with the present invention. The tows 25 greatly increase the shear strength of the ply 20 in the direction perpendicular to the fibers. The tows 25 also greatly increase the tensile strength in the direction of the fiber flow, but it is the shear strength that is of primary interest in this invention. The composite panel 10 formed in the binding process is used to produce the composite shear pins of the present invention.

Figure 4:
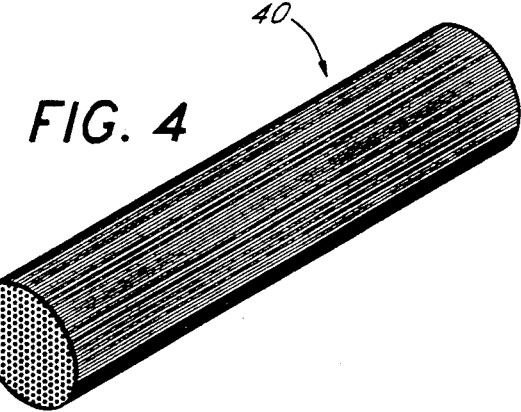
FIG. 4 shows a short section of round cross-sectioned rod which has been machined from a square cross-sectioned rod.
Figure 5A:
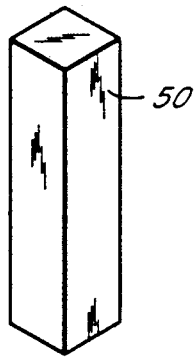
FIGS. 5a–5c show the steps used to fabricate a threaded shear pin.
Figure 5B:
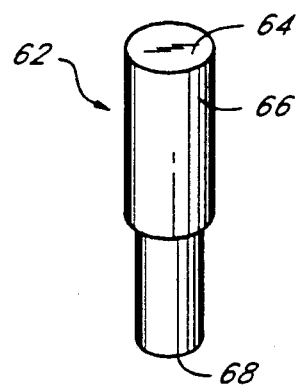
Figure 5C:
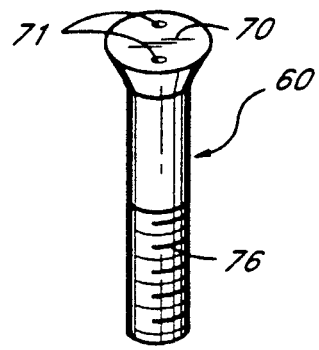

To use the panel 10 to make a shear pin, a section of the bar 12 is cut from the edge of the panel 10 in a lengthwise direction, as indicated in FIG. 1. The bar 12 can then be machined by turning it on a lathe or by grinding between centers. The machined rod is then cut into shorter pieces to produce a cylindrical rod 40, as shown in FIG. 4. It should be noted that the axis of the rod 40 will be parallel to the lengthwise edge of the panel 10. As an alternative, the bar 12 may be cut into individual shorter pieces of bar stock 50 as shown in FIG. 5a. FIGS. 5a–5c show the manufacture of an individual threaded shear pin fastener 60 in stages. The square cross-section bar stock 50, or cylindrical rod 40, is turned on a lathe or is ground to produce blanks 62 as shown in FIG. 5b. The blank 62 has a head end 64, a shank portion 66, and tail end 68. The portion of the blank 62 to be formed into threads is cut down to a diameter approximately 0.005 inch smaller than the minor diameter of the thread to be formed. The machined blank 62 is then inserted into a suitable die and formed by the application of heat and pressure into the threaded shear pin 60 as shown in FIG. 5c. The shear pin 60 has a head 70 and a threaded portion 76. Of course, if it is not desired to produce the shear pin 60 with threads 76, a head 70 can be simply formed on the cylindrical rod 40 to produce a rivet.

Figure 6:
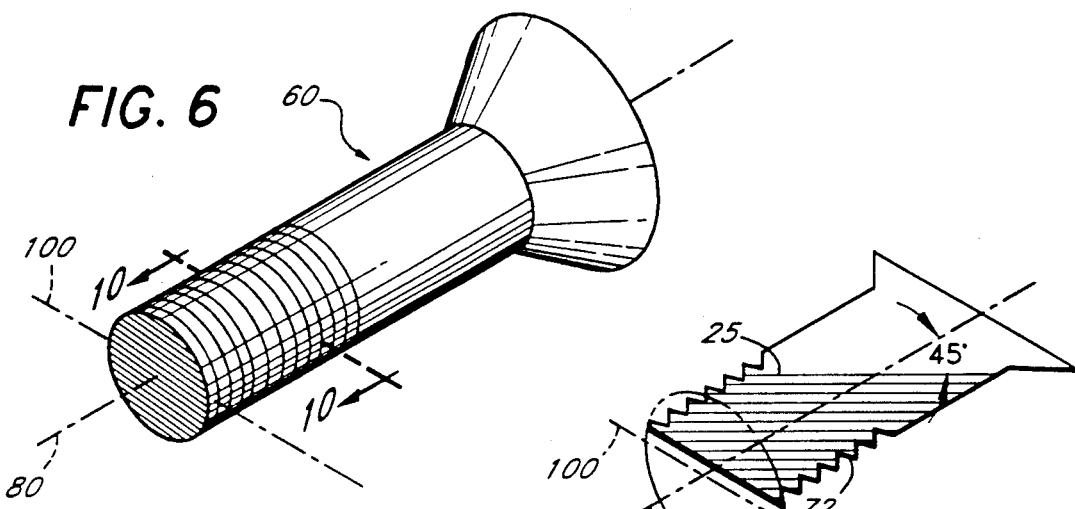
FIG. 6 is an enlarged perspective view of a threaded shear pin.

When all of the tows 25 are orientated in the same direction in the pin 60, parallel to a shear pin axis 80 (shown in FIG. 6), the shear pin 60 is said to be made using a "unidirectional" lay-up panel. When the tows 25 are oriented in different directions in the pin 60, the shear pin 60 is said to be made using a "multidirectional" lay-up panel.

The physical characteristics of the produced shear pin 60 may be influenced by the orientation of the plies 20, or more specifically, the direction of the tows 25 in the adjacent plies 20. Although the fibers within a tow may be either twisted or straight, the tow angles are more commonly referred to as fiber angles. In some applications, the average shear strength of the shear pin 60 can be increased by orienting the tows 25 so that they are angled relative to one another in adjacent plies 20.

Figure 7:
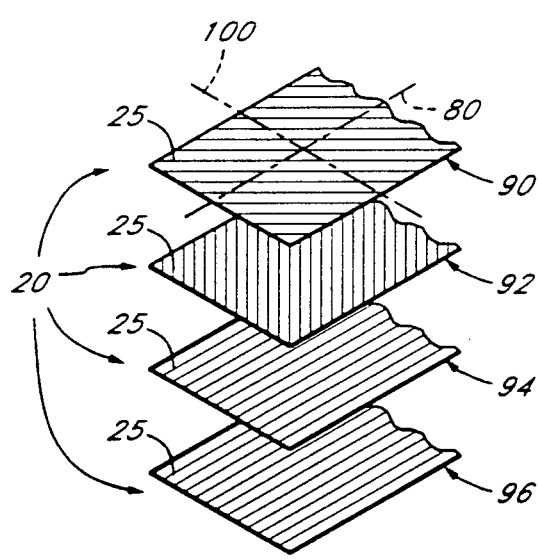
FIG. 7 shows the layers of tape from which a typical panel is made, and draws attention to the angles of the fibers within the tape.

FIG. 7 is an exploded view of a four layer section of the panel 10. The section of the panel 10 illustrated in FIG. 7 has layers with tows 25 that are not parallel to the tows 25 in adjacent layers of the panel 10. FIG. 7 also shows the pin axis 80 which is parallel to the bar 12 on the edge of the panel 10, as seen if FIG. 1, and the axis 100 which is perpendicular to the pin axis 80.

In one embodiment, a top ply 90 is shown to have tows 25 which run at a first angle relative to the axis 80. Preferably, the first angle is 45° as measured in the clockwise direction from the axis 80. A next ply 92 has tows 25 which extend preferably, at a second angle of 135° as measured in the clockwise direction from the axis 80. A next ply 94 has tows 25 which extend at a third angle of 0°, that is substantially parallel to the axis 80. Finally, a bottom ply 96 has tows 25 which are substantially parallel to the tows 25 of the ply 94, as well as the axis 80. This pattern is then repeated throughout the panel 10.

The configuration of the plies 20 shown in FIG. 7 provides increased shear strength to the composite material of the panel 10 when the pattern of fiber orientation within adjacent plies 20 is repeated throughout the entire panel 10. That is, when every set of four plies 20 has tows 25 which are angled at 45°, 135°, 0°, and 0° for successive layers in the panel 10. A panel which has fiber orientations such as those shown in FIG. 7 is said to have a 45/135/0/0 lay-up.

The procedure for manufacturing the panel 10 so that it has a 45/135/0/0 lay-up is similar to the procedure for manufacturing the panel 10 if a unidirectional lay-up is desired. Namely, the plies 20 are stacked one on top of the other so that the tows 25 are oriented at the desired angles. The stack of plies 20 is then heated and compressed to form the panel 10 which later cools and hardens. The shear pin 60 is then manufactured in the manner shown in FIGS. 5a–5c. Surprisingly, a shear pin manufactured from a panel having a 45/135/0/0 lay-up will have increased shear strength relative to a shear pin manufactured from a panel having a unidirectional lay-up.

Figure 8:
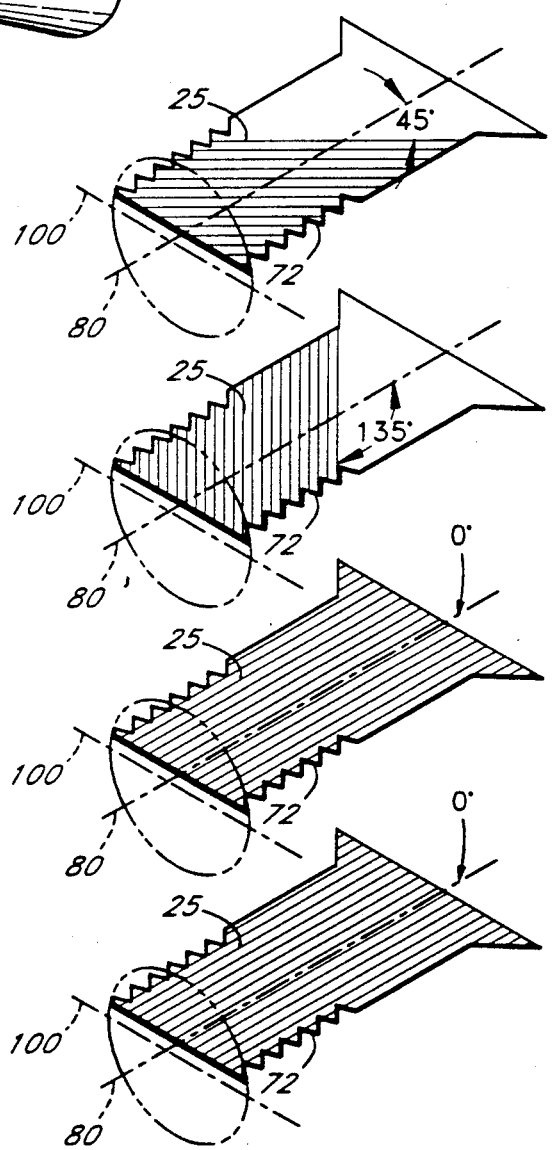
FIG. 8 is a cross-sectional, perspective view which shows how the various fiber angles relate to the axis of the shear pin.

FIG. 8 is a cross-sectional perspective view of the different layers within the shear pin 60. FIG. 8 shows how the shear pin 60, having a 45/135/0/0 lay-up, would look if separated for examination. As can be seen in FIG. 8, the angular orientations of the tows 25 within the shear pin 60 are measured relative to the longitudinal axis 80 of the shear pin 60. The multidirectional fiber lay-up shown increases the shear strength of the threads 72 when a tension load is applied to the shear pin 60.

As set forth above, it has been found that some composite fasteners which have a multidirectional lay-up exhibit a higher average shear strength than composite fasteners which have a unidirectional lay-up. For example, the shear strength of the shear pin 60 averaged over all the directions of shear is higher (about 57 KSI) for a 45/135/0/0 lay-up than for a unidirectional lay-up (about 50 KSI).

Figure 9:
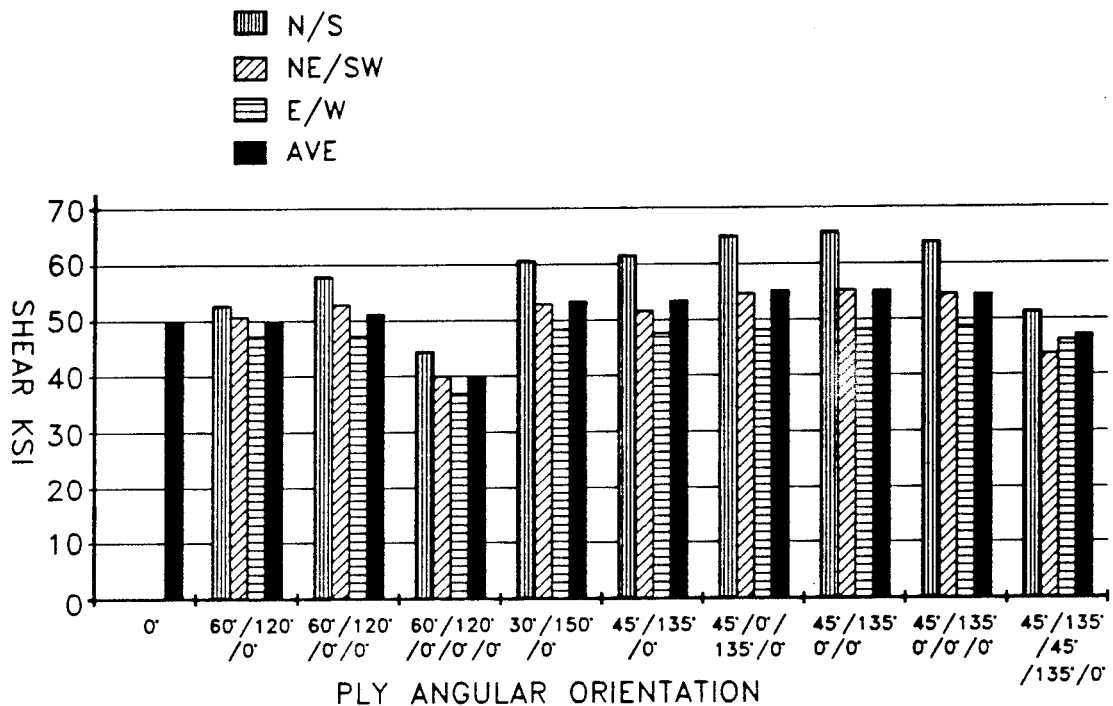
FIG. 9 is a column chart showing the relationship between fiber orientation in the consecutive layers within the various panels, and the shear strength of the shear pins made from these panels measured in three different directions.
Figure 10:
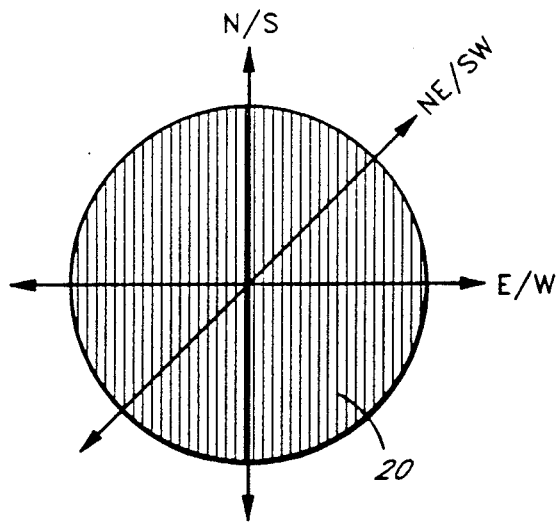
FIG. 10 is a cross-sectional view along a line 10—10 of the shear pin shown in FIG. 6, which shows three shear directions relative to the orientation of the layers within the shear pin.

In accordance with the invention, it has also been determined that a shear pin, having a multidirectional lay-up, has different shear strengths for different directions of shear. Furthermore, it can be seen that shear pins with different lay-up angle combinations display different shear strength characteristics. FIG. 9 is a column chart showing the relationship between selected lay-up angle combinations and shear strengths in three directions normal to the longitudinal axis 80 of the pin 60. The columns indicate the shear strengths obtained when shear pins are sheared using the method of MIL-STD-1312, Test 20, in the directions described as N/S (North-South), NE/SW (Northeast-Southwest), and E/W (East-West). These shear directions are arbitrarily designated, but are defined in relation to the orientation of the plies 20 within the shear pin 60. As shown in FIG. 10, the direction designated as N/S is parallel to the planes of the schematically illustrated plies 20. The pins tested were made from tape sold by Hercules, identified as IM7, and contained carbon fibers bonded by PEEK resin.

Each of the specified multi-directional lay-up angle combinations shown in FIG. 9 (e.g., 30/150/0, 45/135/0, etc.) has three columns indicating the shear strength of that lay-up angle combination in the three shear directions (i.e., N/S, NE/SW, and E/W). Each of the specified lay-up angle combinations also has a fourth column which indicates the average value of the shear strengths measured for all three shear directions. A single column indicating the average shear strength of a shear pin having a unidirectional lay-up is also shown for reference in FIG. 9. Only a single figure is shown for the unidirectional lay-up because it has been found that the shear strength is about the same in any direction.

By contrast, for the multidirectional lay-up it can be seen that in general the highest shear strength is displayed in the N/S direction, the lowest shear strength is displayed in the E/W direction, and an intermediate shear strength is displayed in the NE/SW direction. In particular, it can be seen that the shear strength exhibited in the N/S direction by the shear pin, having a 45/135/0/0 lay-up, is about 66 KSI, meaning this shear pin will bear a load of about 66 KSI when it is oriented so that the shear load is applied in the N/S direction. The pins with lay-ups 45/0/135/0 and 45/135/0/0/0 have about the same characteristics as the 45/135/0/0 lay-up. Note that a shear strength of 66 KSI represents a very significant improvement over the 50 KSI shear strength exhibited by shear pins having unidirectional fiber lay-ups.

It should also be noticed that the lowest shear strength for the 45/135/0/0 lay-up and the two on either side, is still close to the shear strength exhibited by a shear pin having a unidirectional lay-up (i.e., 50 KSI). Therefore, the shear pin having a 45/135/0/0 lay-up does not compromise much shear strength in any direction when compared to a shear pin having a unidirectional lay-up.

Note also, that all of the multidirectional lay-ups represented in FIG. 9 have the best shear strength in the direction parallel to the layers, while, as noted above, in the unidirectional lay-up, the orientation of the layers makes no substantial difference in shear strength.

In many applications, and particularly in aerospace applications, the direction of the primary shear load in a fastener is known. Therefore, it may only be necessary to provide a high resistance to shearing in a single direction. By aligning the shear pin 60 so that the N/S direction is oriented in the direction of maximal shear, a significant increase in shear strength is realized. Thus, in order to maximize the shear strength of the shear pin 60, having a multidirectional lay-up, it is desireable to know the orientations of the plies within the shear pin 60 so that the direction designations can be determined.

In a preferred embodiment of the present invention, the shear pin 60 is marked to indicate the orientation of the plies in the shear pin 60. In one embodiment, the marks, or indicia, indicate the orientation of the N/S shear direction. For example, the indicia may consist of two dots 71 made on the head 70, shown in FIG. 5c, which delineate the diameter of the shear pin 60 in the N/S direction. Of course, the shear pin 60 can be made with different types of indicia. For instance, the shear pin 60 may include indicia on the threaded portion 72. The indicia may also be a line or hatch marks. Furthermore, the indicia may indicate the orientation of the layers within the shear pin 60 or, alternatively, the orientation of the fibers within the shear pin 60.

Shear pins having marks which indicate the orientation of highest shear strength can be easily aligned and located to provide maximum strength for the attachment of two sections of material. In an especially advantageous embodiment, the shear pin 60 having a 45/135/0/0 lay-up fastens two sections of composite aircraft material together, and is aligned so that the N/S direction experiences the maximal load. The composite shear pin 60 can then provide a shear strength of 66 KSI, which allows the composite shear pin 60 to replace metal shear pins in applications requiring a shear strength in excess of 50 KSI.

Although shear pins of the threaded variety have received most frequent mention throughout this description of the preferred embodiment, the same construction may be used to provide high single-direction shear strengths for other shear pin designs, such as solid rivets and lockbolts.

We claim:

1. A fastener made of composite material, including a plurality of planar, generally parallel layers bonded together by a binder, said layers having elongated fibers, substantially all of the fibers in each layer extend generally parallel to the other fibers in that layer, said fastener having a shank with a longitudinal axis extending generally parallel to said layers, a head on one end of the shank, and indicia which indicates the orientation of said layers in said fastener.

2. The fastener of claim 1 wherein the fibers in selected layers are skewed with respect to fibers in other layers.

3. The fastener of claim 1 wherein said indicia is placed on the head of said fastener.

4. The fastener of claim 1 wherein said indicia comprises a pair of marks which define a line parallel to the direction of said layers.

5. The fastener of claim 1 wherein a portion of the shank is threaded.

6. The fastener of claim 1 wherein said fibers are carbon.

7. A fastener made of a composite material including a plurality of planar, generally parallel layers bonded together by a binder, said layers having elongated fibers substantially all of the fibers in a layer extend generally parallel to each other, said layers being oriented so that fibers in selected layers are skewed with respect to fibers in other layers, said fastener having a shank with a longitudinal axis extending generally parallel to said axis, and indicia on said fastener which indicates the orientation of the fastener which has the highest shear strength in a direction perpendicular to said shank.

8. The fastener of claim 7 wherein said fastener has a head on one end of said shank, and said indicia is placed on said head.

9. The fastener of claim 7 wherein said indicia comprises a pair of marks which define a line parallel to the direction of highest shear strength.

10. The fastener of claim 7 wherein a portion of the shank is threaded.

11. The fastener of claim 7 wherein said fibers are carbon.

12. The fastener of claim 7 wherein said layers are arranged in successive groups that provides a repeating pattern of fiber angular arrangement, and with each group including at least one layer wherein the fibers extend substantially parallel to said axis.

13. The fastener of claim 12 wherein each group has four layers.

14. The fastener of claim 12 wherein each group has at least one layer in which its fibers extend at one angle of approximately 45° with respect to said axis.

15. The fastener of claim 12 wherein said layers are arranged in a repeating fiber angularity pattern of 45°/0°/135°/0° with respect to said axis.

16. The fastener of claim 12 wherein said layers are arranged in a repeating fiber angularity pattern of 45°/135°/0°/0° with respect to said axis.

17. An elongated fastener having a shank with a longitudinal axis, said fastener being made of a composite material made of a group of successive layers which are generally planar across the width of said fastener shank and have fibers oriented at predetermined angles running therethrough, said group of successive layers comprising a first layer, having its fibers oriented at approximately 45° with respect to said longitudinal axis, a second layer having its fibers oriented at approximately 135° with respect to said longitudinal axis, a third layer having its fibers oriented substantially parallel to said longitudinal axis, and a fourth layer having its fibers oriented substantially parallel to said longitudinal axis.

18. The fastener of claim 17 wherein a portion of the shank is threaded.

19. An elongated fastener having a shank with a longitudinal axis, said fastener being made of a composite material made of a group of successive layers which are generally planar across the width of said fastener shank and fibers oriented at predetermined angles running therethrough, said group of successive layers comprising a first layer having its fibers oriented at approximately 45° with respect to said longitudinal axis, a second layer having its fibers oriented at approximately 135° with respect to said longitudinal axis, a third layer having its fibers oriented substantially parallel to said longitudinal axis, a fourth layer having its fibers oriented substantially parallel to said longitudinal axis, and indicia which indicates the orientation of said layers in said fastener.

20. An elongated fastener having a shank with a longitudinal axis, said fastener being made of a composite material made of a group of successive layers which are generally planar across the width of said fastener shank and fibers oriented at predetermined angles running therethrough, said group of successive layers comprising a first layer having its fibers oriented at approximately 45° with respect to said longitudinal axis, a second layer having its fibers oriented at approximately 135° with respect to said longitudinal axis, a third layer having its fibers oriented substantially parallel to said longitudinal axis, a fourth layer having its fibers oriented substantially parallel to said longitudinal axis, and indicia which indicates the orientation of the fastener that has the highest shear strength generally perpendicular to said fastener axis.

21. The fastener of claim 20 wherein said indicia is placed on a head on one end of said shank.

22. The fastener of claim 21 wherein said indicia comprises a pair of marks which define a line parallel to the direction of highest shear strength.

* * * * *